(No Model.)
W. T. M. MOTTRAM.
ELECTRIC CURRENT METER.
No. 509,750. Patented Nov. 28, 1893.
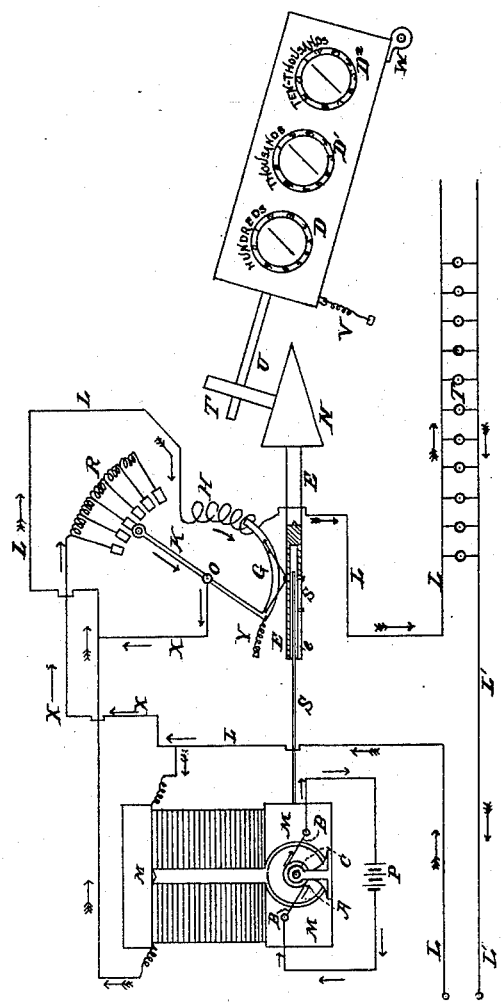
Witnesses:
George E. Cruse.
Edward L. Knight.
Inventor:
William T. M. Mottram
By Knight Bros.
Attorneys
THE NATIONAL LITHOGRAPHING COMPANY,
WASHINGTON, D. C.

UNITED STATES PATENT OFFICE.

WILLIAM T. M. MOTTRAM, OF DALLAS, TEXAS.

ELECTRIC-CURRENT METER.

SPECIFICATION forming part of Letters Patent No. 509,750, dated November 28, 1893.

Application filed May 23, 1891. Serial No. 393,891. (No model.)

*To all whom it may concern:*

Be it known that I, WILLIAM T. MOTTRAM, a subject of the Queen of Great Britain, residing at Dallas, in the county of Dallas and State of Texas, United States of America, have invented certain new and useful Improvements in Electric-Current Meters, of which the following is a specification.

My invention relates to meters intended to measure the amount of electricity passing over a given branch of derived or (if desired) line circuit, thereby indicating the amount of electricity used for the translating or other consuming devices in the circuit, having for its object the construction of an apparatus which will respond more accurately to the variations in the said currents and indicate more exactly upon a dial or dials provided for the purpose, the quantity of electricity which passes.

My invention also has for its object the provision of means whereby the range of the meter may be increased to any desired extent.

My invention therefore consists in certain novel ideas and details of construction as hereinafter more clearly described, and particularly pointed out in the claims.

Heretofore electric meters consisting of motors run by the supply current when interposed in said circuits have had their field-of-force magnets wound in series with the translating devices and the armatures excited by derived circuits or connected as shunts. The result of such an arrangement is, that the excitement of both the field and armature are variable owing to the inconstancy of the supply and the indication on the dial is the result of a variable influenced by a variable, which is a result far from satisfactory, inasmuch as it is not the true indication. I have found in practice that a great error arises from the variations of electro-motive force in the circuit by which the armature has heretofore been excited, which error is almost fatal to the meter for the reason that a variation of two per cent. in pressure results in a twenty-five per cent. variation in the speed of the armature, when no change has been made in the work on the circuit. To overcome these obstacles is the object of my present invention, wherein I provide means for maintaining one member of a motor in a state of absolutely constant excitement by means wholly independent of the line circuit, and excite the other member by the current to be consumed, thus having a constant affecting or affected by a variable to be measured whereby the accuracy of the indications of the meter is insured. I have also found that the simple meter will record over a certain range, but when the current circulating around the motor magnet increases so that the magnet becomes saturated, the rotation of the armature ceases to increase and consequently the recorder ceases to give the true readings. It is therefore necessary to increase the range of meter so that the consumption of current will continue to be registered after the point of saturation is reached, and this I effect by the employment of means whereby the magnet is prevented from reaching the point of saturation by reducing its exciting current proportionally to the increase in the main current, said means being also adapted to correspondingly increase the rotation of a meter shaft.

In carrying out the first part of my invention, it is obvious that either the field or the armature may readily be made constant by exciting it with a current from any independent local source of constant potential, the other member in either case being excited by the current from the supply circuit to be measured. I prefer, however, to wind the field in series with the translating devices and excite the armature by a standard battery which would keep the potential absolutely constant at the terminals of the armature, thereby making the indications of the meter accurately in correspondence with the changes on the line (or branch of the line) circuit.

In carrying out the second part of my invention, I provide a suitable resistance circuit between the terminals of the magnet or armature circuit with means for decreasing said resistance proportionally to the increase in the current consumed so as to short circuit in a measure the exciting current and prevent the magnet reaching the point of saturation. The means for controlling the resistance also controls the gearing between the motor shaft and the indicator mechanism in such a manner that the indicating mechanism is driven faster proportionally to the decrease of the resistance of the short circuit, which prevents saturation of the magnet, and consequently proportionally to the increase of current consumed. This is carried out in one way by providing an electro-magnetic device such as a solenoid magnet and core which operates to decrease the resistance in the short circuit, and at the same time, shifts a bevel friction wheel upon which bears a driving wheel of the indicator, so that the speed of the latter is increased when it is driven by the larger portion of the bevel wheel's periphery.

In order that my invention may be more fully understood, I will proceed to describe it with reference to the accompanying drawings, which is a diagrammatic view, illustrating the different features of my invention.

L is a supply wire from the line, being wrapped on the field magnet M of the indicator motor and passing on to the translating devices T. The current returns by L'.

A is the armature of the indicator motor having commutator C and brushes B. The armature is fed by a standard local battery P of constant potential.

S is a shaft geared to the armature shaft and adapted by suitable toothed or friction wheels in the register, to designate by the movement of the indicators I, over the dials D, D', D², hundreds, thousands, and tens of thousands of the units of measurement of the current that has passed over the supply wire L. While this is the preferred form of my simple measuring apparatus, I do not limit myself to the precise arrangement, for I may use any equivalent way of having the excitement of one member constant and the other variable. I may also use any common and desirable means for maintaining a constant potential at the terminals of the commutators, applied to any desirable and suitable source, such as a magneto-electric machine controlled by a suitable governor.

E is a sleeve fitting loosely over the shaft S and having a longitudinal slot $e$ in which works a pin $s$, so that the sleeve will have no rotary play relatively to the shaft S, but will be free to move longitudinally thereon.

K is an arm pivoted at O contacting at one end with the resistance R and controlled by the solenoid core G formed on the other end. This core G is also connected to the sleeve E and thereby gives it a longitudinal movement relatively to the shaft. A circuit through X, R, K, O, X, starting and terminating in the main supply on opposite sides of the field magnet, acts as a short circuit to reduce the current through the magnet, if the resistance is sufficiently reduced.

H is a solenoid magnet interpolated in the supply circuit and is adapted when the current is of sufficient strength to attract the core G and thereby shift the sleeve E and contact arm K. Upon reduction of the current, the core with its parts attached resumes its normal position by its own weight, or is returned by a suitable spring Y.

N is a friction cone mounted on and driven by the sleeve or shaft E and on it bears a friction wheel T held in contact by a spring or other suitable means. The wheel T is mounted on or connected with a shaft U which passes into the register and gears with its mechanism. The operation of this cone is to move longitudinally and rotate the wheel T faster or more slowly accordingly as said wheel bears upon the larger or smaller portion of its periphery.

The operation of the device is as follows:— The current to be consumed, enters by the conductor L, and following the course indicated by feathered arrows passes through the motor magnet circuit to excite said magnet, then on through solenoid coil, then through translating devices, and returns through L'. At the same time the armature of the motor is being excited by the local battery P the course of whose current is indicated by small unfeathered arrows. The motor is thus set in operation and the movement of its shaft being faster or slower in accordance with the strength of the supply current, the revolutions and consequently the amount of electricity passing will be duly registered by the meter. If the current in the supply wire L should increase in strength, to such an extent as to be sufficient to saturate the motor magnet whereby the speed of the motor would cease to increase with the increase in current, and accurate measurement thereby cease, the attractive force of the solenoid magnet H will be such as to attract and draw in the core G and thereby shift the arm K. By this movement of the arm K, the resistance through the bridge circuit is reduced to such an extent that the current through the motor-magnet coil is reduced sufficiently to prevent the magnet reaching the point of saturation. By this means the excitement of the magnet after reaching a certain degree, remains somewhat constant, or may decrease if the solenoid continues to increase in strength, and the increase of current from such point on, is registered by means of the bevel driving gear, as hereinbefore fully explained.

As before stated, the drawings represent diagrammatically the principles of my invention, and it is obvious that the mechanical structure of the gearing and other parts would be varied in practice.

Having thus described my invention, the following is what I claim as new and desire to secure by Letters Patent:

1. An electric meter, comprising a suitable register, and two elements or members operating one upon the other when electro-magnetically excited, the excitement of one member being constant, and the excitement of the other being varied according to the current to be measured, so that the record of the register is the result of the action of a constantly excited member affected by or affecting the variable to be measured, substantially as herein shown and described.

2. An electric meter, consisting of a suitable register and an electric motor controlling the same; the excitement of one of the members of said motor, being by means of an independent constant source, and the excitement of the other being controlled by the current to be measured, substantially as herein shown and described.

3. An electric meter, consisting of a suitable register and an electric motor connected to said register; the field of the motor being excited by the current to be measured and the armature being excited by an independent local electrical supply of constant potential, substantially as herein shown and described.

4. In an electric meter, the combination of a supply circuit, an electric motor, and suitable indicating mechanism controlled by said motor; the field magnet of the motor being wound in series with the supply circuit and having suitable regulating mechanism, and the armature being fed by an independent source of constant potential, substantially as herein described.

5. In an electric meter, the combination with the motor having its field magnet wound in series with the supply circuit, and an indicator for recording the revolutions of the shaft; of a bridge circuit connecting the main circuit on opposite sides of the magnet, a resistance in said bridge circuit, varying gear interposed between the motor and the indicator, comprising the sleeve longitudinally movable on and driven by the motor shaft, the bevel wheel carried by the sleeve, an indicator driving wheel engaging the bevel wheel, and a solenoid interpolated in the main circuit whose core controls the switch of the resistance and the longitudinal movement of the sleeve, substantially as herein described.

6. In an electric meter, the combination with a motor controlled by the current to be measured, of a resistance device for limiting the excitement of the motor, an indicator for registering the revolutions of the motor and a governor for varying the gearing between the motor and indicator and controlled by the resistance device, substantially as herein described.

7. In an electric meter, substantially as described, the combination with the mechanism operated by the passage of current and mechanism for registering such operation, of a branch circuit for preventing the overcharging of mechanism operated, and an electro-magnetic device for controlling said branch circuit and correspondingly varying the connection between the two mechanisms, as fully explained.

WILLIAM T. M. MOTTRAM.

Witnesses:
J. K. URIE,
C. H. LEBOLD.